United States Patent [19]

Hackforth

[11] Patent Number: 4,911,484

[45] Date of Patent: Mar. 27, 1990

[54] CLAMPING RING PIPE CONNECTION FOR METALLIC PIPES

[75] Inventor: Bernhard Hackforth, Herne, Fed. Rep. of Germany

[73] Assignee: Hackforth GmbH & Co. KG, Herne, Fed. Rep. of Germany

[21] Appl. No.: 287,389

[22] Filed: Dec. 20, 1988

[30] Foreign Application Priority Data

Dec. 24, 1987 [DE] Fed. Rep. of Germany ... 8716962[U]

[51] Int. Cl.$^4$ ............................................. F16L 13/14
[52] U.S. Cl. ................................. 285/382.2; 285/382; 29/515
[58] Field of Search .................. 285/382, 382.1, 382.2, 285/382.7; 29/511, 515, 525, 525.1

[56] References Cited

U.S. PATENT DOCUMENTS

| 2,417,536 | 3/1947 | Wurzburger | 285/382.7 |
| 3,466,066 | 9/1969 | Dawson | 29/525 |
| 4,531,577 | 7/1985 | Humpolik et al. | 285/382.2 |
| 4,598,938 | 7/1986 | Boss et al. | 285/382.2 |
| 4,705,302 | 11/1987 | Beiley | 285/382.2 |

Primary Examiner—Randolph A. Reese
Assistant Examiner—Anthony Knight
Attorney, Agent, or Firm—Robert W. Becker

[57] ABSTRACT

To produce a pipe connection, one of the pipes that are to be interconnected has a pipe end that is widened in a cuplike manner, in which the pipe end of the other pipe is positively lodged. Before the two pipe ends are fixed together, a metallic clamping ring, the inside diameter of which is less than the outside diameter of the outer pipe end, is placed onto the inner pipe end. With the aid of a suitable assembly tool, the clamping ring is then pressed onto the outer pipe end. This produces a radial compression of the interengaging pipe ends, and simultaneously a radial expansion of the clamping ring in the elastic range. So that the clamping ring in the assembled position produces a deformation and clamping of the interengaging pipe ends over as great an axial length as possible, the outer surface of the clamping ring has an encircling reduction in the central section between the shorter substantially cylindrical end sections.

3 Claims, 1 Drawing Sheet

CLAMPING RING PIPE CONNECTION FOR METALLIC PIPES

BACKGROUND OF THE INVENTION

The present invention relates to a clamping ring for establishing a connection for metallic pipes that have interengaging pipe ends. A tubular metallic clamping ring that can be pressed axially onto the outwardly disposed pipe end produces a radial compression of the pipe ends when they are placed together. In the initial state, the clamping ring has a conical inflow or receiving section on the inside, a cylindrical central section with a diameter that is less than the outside diameter of the outwardly disposed pipe end, and a conically narrowing end section.

A clamping ring pipe connection of this general type is known. The production of such a pipe connection is brought about by an axial pressing-on of a clamping ring. Since the inside diameter of the clamping ring is initially less than the outside diameter of the outwardly disposed pipe end, the pressing-on of the clamping ring produces on the one hand a radial contraction of the interengaging pipe ends, and on the other hand an elastic deformation of the clamping ring in the nature of an expansion. With the known pipe connections, the retaining forces, i.e. the forces which are effective against a pulling-apart of the pipe ends, and the sealing forces, are essentially determined by the inner conically narrowing end section of the clamping ring.

If, for example, the load distribution in a clamping ring is effected or applied along the pipe axis, there occurs, after an initial slight increase, a substantially parallel-running load curve until the end section is reached; the load curve increases sharply from this point until there is a peak load.

Although reliable pipe connections can be obtained in this way for many applications, it is unsatisfactory that the clamping ring essentially contributes to the production of the retaining forces over only a part of its axial length. This drawback manifests itself especially with pipe connections having relatively small dimensions.

It is therefore an object of the present invention to embody a clamping ring for such a pipe connection in such a way that the clamping ring produces a deformation of the interengaging pipe ends over a greater axial length than heretofore possible in the assembled position, in order to obtain an increase in the retaining forces and also in the forces that act against twisting.

BRIEF DESCRIPTION OF THE DRAWING

This object, and other objects and advantages of the present invention, will appear more clearly from the following specification in conjunction with the accompanying schematic drawing, in which:

FIG. 1 is a partial longitudinal section through two interengaging pipe ends and one exemplary embodiment of the inventive clamping ring before it is axially pressed on.

SUMMARY OF THE INVENTION

Figure 1:
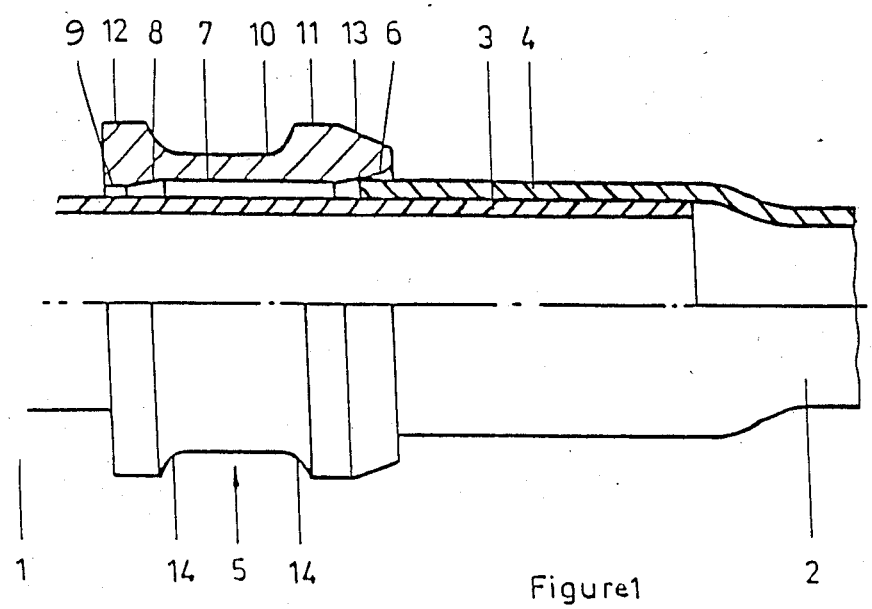

The clamping ring of the present invention is characterized primarily in that the central portion of the outer surface of the clamping ring has an encircling reduction or reduced diameter section as compared with the essentially cylindrical end sections.

The end sections of the outer surface can correspond approximately in their axial length to the lengths of the inner conical sections.

It can, however, also be advantageous to give the receiving-side end section of the outer surface a greater axial length than the inner conical receiving section, with the opposite end sections of the outer surface and of the inner surface having approximately the same axial lengths.

The reduction is advantageously provided with a substantially cylindrical surface, which at its end merges via slightly rounded-off sections into the end sections.

The wall thickness in the area of the reduction of the clamping ring is such that when the pipe connection is established, an expansion almost to the stretching limit of the material can be obtained.

The main advantage that can be obtained with the present invention is based upon the fact that the reduction of the wall thickness in the central section of the clamping ring provides a relatively greater expansion, which manifests itself in a barrel-like deformation. Linked with this is a corresponding deformation of the interengaging pipe ends, so that overall an undulating course of the walls is produced. As a result of this deformation, there is produced an increase of the axial extraction resistance and of the torsional resistance of the pipes that are connected together.

By means of the dimensioning of the wall thickness in the area of reduction, the expansion load of the clamping ring after assembly can be established in such a way that the stretching limit of the material is just reached. Thereby, the deformation or clamping action of the clamping ring is extended to roughly ¾ of the axial length of the clamping ring, as compared with previously constructions.

The reduction of the wall thickness of the clamping ring in the central section furthermore results in a reduction of the assembly force. This is desirable for obvious reasons, and constitutes a further advantage of the invention. Added to this is the fact that the aforementioned advantages can be obtained purely by a variation in shape of the outer surface of the clamping ring.

Further specific features of the present invention will be described in detail subsequently.

Description of Preferred Embodiments

Referring now to the drawing in detail, of the two smooth walled pipes 1, 2 that are to be connected together, the end 3 of the pipe 1 is inserted positively or tightly in the widened end 4 of the other pipe 2. However, before the two pipe ends 3 and 4 are fitted together, a metallic clamping ring 5 is slipped over the pipe end 3, with the inflow or receiving end of the ring 5 facing the pipe end 4.

The inner surface of the metallic clamping ring 5 comprises a conical receiving section 6, a cylindrical central section 7, and a conically narrowing end section 8 to which, in the illustrated embodiment, a short cylindrical section 9 is connected; this cylindrical section can also be omitted. In the cylindrical central section 7, the diameter is less than the outside diameter of the pipe end 4. The conical receiving section 6 makes it easier to push the clamping ring 5 onto the pipe end 4.

On the outside, the clamping ring 5 is provided in the central area with an encircling or circumferentially extending reduction or reduced diameter section 10, which is delimited by substantially cylindrical end sections 11 and 12; the end section 11 has a slight conical surface 13 on the inflow or receiving side. The conical surface 13 has no significance for the clamping function of the clamping ring 5; it is merely intended to make clear the direction in which the clamping ring 5 is to be slipped on. The encircling reduction 10 has a cylindrical surface that is concentric to the pipe axis, with the ends of this cylindrical surface merging via rounded-off sections 14 into the end sections 11 and 12.

The known clamping ring for such a pipe connection has a shape somewhat similar to that of the inventive clamping ring illustrated in the drawing, but has no encircling reduction on the outside, so that the known clamping ring has a more or less constant wall thickness. With such a clamping ring, the radial compression of the pipe ends that have to be connected is produced, in the assembled position, mainly by the conically narrowing end section. This means that only a part of the axial length of the clamping ring contributes to creating the deformation of the pipes that are being connected, and hence to creating the desired retaining forces.

Figure 2:
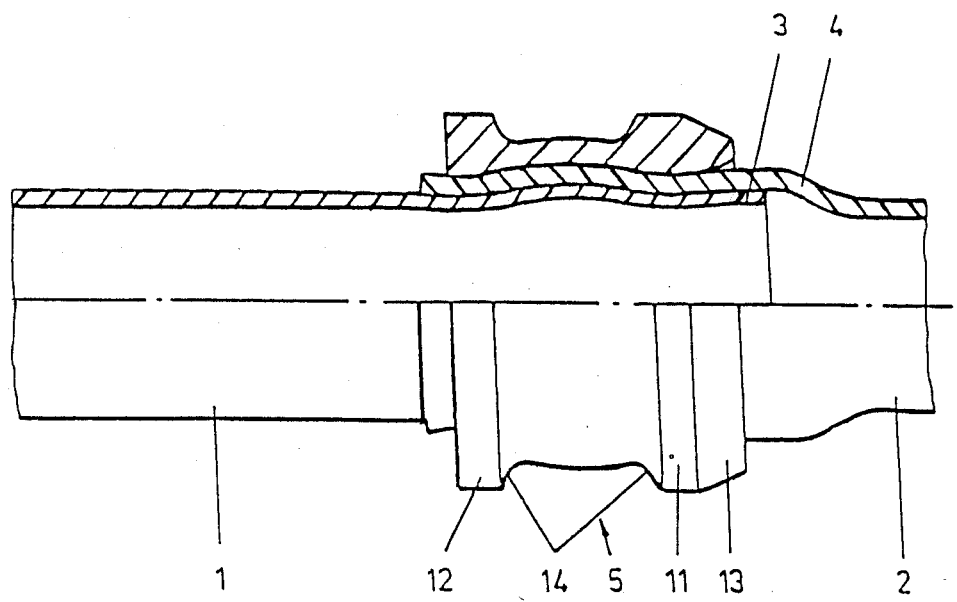
FIG. 2 is a partial longitudinal cross-section of the clamping ring pipe connection of FIG. 1 after assembly of the clamping ring.

The conditions are different when a clamping ring designed according to the present invention is used. When this novel clamping ring is pressed on, the interengaging pipe ends 3 and 4 are initially slightly deformed, i.e. compressed, by the receiving section 6 of the clamping ring 5 in conformity with the radial force that becomes effective. In so doing, an outwardly directed elastic restoring force is created. Because of the smaller wall thickness in its central section, as the clamping ring 5 is pushed on further it cannot apply the same counter-force as does the receiving section 6, so that the central section is expanded in a barrel-like manner due to the inherent elasticity of the pipe ends 3 and 4, as illustrated in FIG. 2. With the further axial pressing-on of the clamping ring 5, the conically narrowing end section 8 eventually comes into action, now producing a correspondingly stronger radial deformation than did the receiving or entry section 6.

The stress or load in the central section of the clamping ring 5 can be such that the 0.2 limit, i.e. the stretching limit, of the material is not quite reached. The spring action of the clamping ring 5 is consequently extended to almost ¾ of its axial length. In this way, the retaining forces, i.e. the forces acting against retraction and torsion, are considerably increased, so that a firmer connection is produced overall. On the other hand, the force necessary for assembly is reduced due to the smaller resistance in the central section of the clamping ring 5.

The present invention is, of course, in no way restricted to the specific disclosure of the specification and drawing, but also encompasses any modifications within the scope of the appended claims.

What I claim is:

1. A tubular metallic clamping ring for establishing a connection between two metallic pipes, the ends of which for this purpose interengage one another, with said clamping ring being adapted to be pressed axially onto the more outwardly disposed one of said pipe ends to produce a radial compression thereof when said pipe ends interengage one another, and with said clamping ring having a radially inwardly directed surface, and a radially outwardly directed surface, whereby prior to said clamping ring being pressed axially onto the more outwardly disposed one of said pipe ends:

said radially inwardly directed surface, starting from that end thereof that first engages the more outwardly disposed one of said pipe ends, comprises: a conical receiving section; a cylindrical central section, the diameter of which is less than the outside diameter of the more outwardly disposed one of said pipe ends; and a conically narrowing end section; and said radially outwardly directed surface comprises: two essentially cylindrical end sections, and therebetween an encircling reduced diameter section, the diameter of which is less than the diameter of said two cylindrical end sections.

2. A clamping ring according to claim 1, in which said conical receiving section of said inwardly directed surface has an axial length that is less than the axial length of the corresponding cylindrical end section of said outwardly directed surface, and said conically narrowing end section of said inwardly directed surface has an axial length that is approximately the same as the axial length of the corresponding cylindrical end section of said outwardly directed surface.

3. A clamping ring according to claim 1, in which said reduced diameter section of said outwardly directed surface is an essentially cylindrical surface having end regions that merge with said cylindrical end sections via respective gently rounded-off sections.

* * * * *